(12) United States Patent
Gschwind et al.

(10) Patent No.: US 10,592,142 B2
(45) Date of Patent: Mar. 17, 2020

(54) TOGGLING MODAL TRANSIENT MEMORY ACCESS STATE

(71) Applicant: INTERNATIONAL BUSINESS MACHINES CORPORATION, Armonk, NY (US)

(72) Inventors: Michael K. Gschwind, Chappaqua, NY (US); Christian Jacobi, Poughkeepsie, NY (US); Younes Manton, Markham (CA); Anthony Saporito, Highland, NY (US); Timothy J. Slegel, Staatsburg, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 39 days.

(21) Appl. No.: 15/281,192

(22) Filed: Sep. 30, 2016

(65) Prior Publication Data

US 2018/0095660 A1 Apr. 5, 2018

(51) Int. Cl.
*G06F 12/00* (2006.01)
*G06F 3/06* (2006.01)
*G06F 12/0877* (2016.01)
*G06F 12/0897* (2016.01)
*G06F 12/1027* (2016.01)

(52) U.S. Cl.
CPC ............ *G06F 3/0634* (2013.01); *G06F 3/061* (2013.01); *G06F 3/0659* (2013.01); *G06F 3/0673* (2013.01); *G06F 12/0877* (2013.01); *G06F 12/0897* (2013.01); *G06F 12/1027* (2013.01); *G06F 2212/1016* (2013.01); *G06F 2212/6022* (2013.01)

(58) Field of Classification Search
CPC ...... G06F 3/061; G06F 3/0634; G06F 3/0659; G06F 12/0897; G06F 12/0877; G06F 3/0673; G06F 2212/1016
See application file for complete search history.

(56) References Cited

U.S. PATENT DOCUMENTS

| | | | |
|---|---|---|---|
| 4,574,346 A | 3/1986 | Hartung | |
| 5,649,153 A * | 7/1997 | McNutt | G06F 12/0866 711/112 |
| 6,343,345 B1 | 1/2002 | Hilla et al. | |
| 2001/0032298 A1* | 10/2001 | Emons | G06F 1/3225 711/138 |
| 2008/0104329 A1* | 5/2008 | Gaither | G06F 12/0888 711/138 |

(Continued)

OTHER PUBLICATIONS

Baker, ED et al. "Selective Cache Utilization Technique," IPCOM000044304D, Dec. 1984, p. 3698 (+ cover).

(Continued)

*Primary Examiner* — Shawn X Gu
(74) *Attorney, Agent, or Firm* — Steven Chiu, Esq.; Kevin P. Radigan, Esq.; Heslin Rothenberg Farley & Mesiti P.C.

(57) ABSTRACT

Transient mode for an application is toggled. Transient mode for an application executing in the computing environment is activated. Based on activating transient mode for the application, a plurality of memory accesses are processed as transient accesses. Based on processing the plurality of memory accesses, transient mode for the application is deactivated.

20 Claims, 8 Drawing Sheets

(56) References Cited

U.S. PATENT DOCUMENTS

| | | | |
|---|---|---|---|
| 2009/0037624 A1* | 2/2009 | Saripalli | G06F 12/0815 |
| | | | 710/72 |
| 2009/0204769 A1* | 8/2009 | Heil | G06F 12/0888 |
| | | | 711/139 |
| 2014/0173216 A1 | 6/2014 | Jayasena et al. | |
| 2015/0331804 A1* | 11/2015 | Vajapeyam | G06F 12/0811 |
| | | | 711/122 |

OTHER PUBLICATIONS

Gonzalez, Antonio et at., "A Data Cache with Multiple Caching Strategies Tuned to Different Types of Locality," ICS '95 Proceedings of the 9th international conference on Supercomputing, Jul. 1995, pp. 1-10.

Hardy, Damien et al., "Using Bypass to Tighten WCET Estimates for Multi-Core Processors with Shared Instruction Caches," Apr. 2009, pp. 3-21 (+ cover).

MC Farling, Scott et al., "Program Optimization for Instruction Caches," ACM SIGARCH Computer Architecture News—Special issue: Proceedings of ASPLOS-III: the third international conference on architecture support for programming languages and operating systems, Apr. 1989, pp. 183-191.

IBM, "z/Architecture—Principles of Operation," IBM Publication No. SA22-7832-10, Eleventh Edition, Mar. 2015, pp. 1-1732.

IBM, "Power ISA—v 2.07B," Apr. 9, 2015, pp. 1-1527.

* cited by examiner

TOGGLING MODAL TRANSIENT MEMORY ACCESS STATE

BACKGROUND

One or more aspects relate, in general, to processing within a computing environment, and in particular, to processing associated with memory accesses.

Computer processors typically operate at higher clock speeds than main memory. To compensate, modern processors employ caches, which are fast local memory banks most often organized in a hierarchy, that aim to hold the most frequently accessed items. Caches are typically faster than main memory, but also smaller. As such, caches are limited resources, and algorithms are used to govern which parts of main memory are to be held in the cache hierarchy. These algorithms are complex, but can be summarized as seeking to place in a cache the data most recently accessed in main memory on the assumption that recently accessed data will be accessed again in the near future. This is temporal locality. Cache algorithms also seek to place in a cache data that is near the data most recently accessed in main memory, on the assumption that data near the most recently accessed data will be accessed in the near future also. This is spatial locality.

Given that the cache is a limited resource and usually cannot contain all of the data a program will access, data that is newly stored in the cache will need to supplant existing data. Most cache algorithms therefore choose to supplant the least recently accessed data in order to make room for the most recently accessed data and adjacent data. Data in this context also refers to the instruction sequences that define a program and are executed when the program is run. These instructions are also captured in the cache much the same way despite being accessed implicitly by the processor, rather than explicitly by the program.

Since cache algorithms seek to take advantage of expected temporal and spatial locality, a lack of temporal and/or spatial locality results in wasting space in the cache hierarchy by storing data that will likely not be accessed again in the near future and supplanting data that may still be accessed in the near future. As such, optimizing a software program to best make use of the cache hierarchy involves attempting to access and operate on small collections of data at any given time and grouping related data closer together. This, however, is not always possible; programs may need to access large collections of data and/or data that is not grouped together, to the detriment of performance. Programs may also occasionally need to access data that is infrequently accessed due to a temporary condition that may shortly subside. Accessing this data has the secondary effect of likely supplanting frequently accessed data from the cache, such that when the temporary condition subsides and the program returns to accessing the previous data, that data will no longer be in the cache, thereby effectively doubling the detrimental performance effects of having to access main memory to retrieve the data.

A program's instructions may also be optimized for temporal and spatial locality in much the same way as data, by limiting the number of instructions executed at any given time and grouping related parts of the program closer together.

SUMMARY

Shortcomings of the prior art are overcome and additional advantages are provided through the provision of a computer program product for facilitating processing in a computing environment. The computer program product comprises a storage medium readable by a processing circuit and storing instructions for execution by the processing circuit for performing a method. The method includes, for instance, activating transient mode for an application executing in the computing environment; processing, based on activating transient mode for the application, a plurality of memory accesses, wherein the plurality of memory accesses are processed as transient accesses; and deactivating, based on processing the plurality of memory accesses, transient mode for the application.

Methods and systems relating to one or more aspects are also described and claimed herein. Further, services relating to one or more aspects are also described and may be claimed herein.

Additional features and advantages are realized through the techniques described herein. Other embodiments and aspects are described in detail herein and are considered a part of the claimed aspects.

BRIEF DESCRIPTION OF THE DRAWINGS

One or more aspects are particularly pointed out and distinctly claimed as examples in the claims at the conclusion of the specification. The foregoing and objects, features, and advantages of one or more aspects are apparent from the following detailed description taken in conjunction with the accompanying drawings in which:

DETAILED DESCRIPTION

In accordance with an aspect of the present invention, a capability is provided to identify data accesses as transient for a selected period. This selected period may be a particular period of time or during a particular phase of a program's execution, as examples. The capability includes using instructions to toggle a modal state in the processor, in which execution of an instruction activates transient mode indicating to the processor that data accesses (e.g., all or one or more selected types) are transient, and execution of another instruction (or the same instruction) deactivates transient mode.

One embodiment of a computing environment to incorporate and use one or more aspects of the present invention is described with reference to FIG. 1. In one example, the computing environment is based on the z/Architecture, offered by International Business Machines Corporation, Armonk, N.Y. One embodiment of the z/Architecture is described in "z/Architecture Principles of Operation," IBM Publication No. SA22-7832-10, March 2015, which is hereby incorporated herein by reference in its entirety. Z/ARCHITECTURE is a registered trademark of International Business Machines Corporation, Armonk, N.Y., USA.

In another example, the computing environment is based on the Power Architecture, offered by International Business Machines Corporation, Armonk, N.Y. One embodiment of the Power Architecture is described in "Power ISA™ Version 2.07B," International Business Machines Corporation, Apr. 9, 2015, which is hereby incorporated herein by reference in its entirety. POWER ARCHITECTURE is a registered trademark of International Business Machines Corporation, Armonk, N.Y., USA.

The computing environment may also be based on other architectures, including, but not limited to, the Intel x86 architectures. Other examples also exist.

Figure 1:
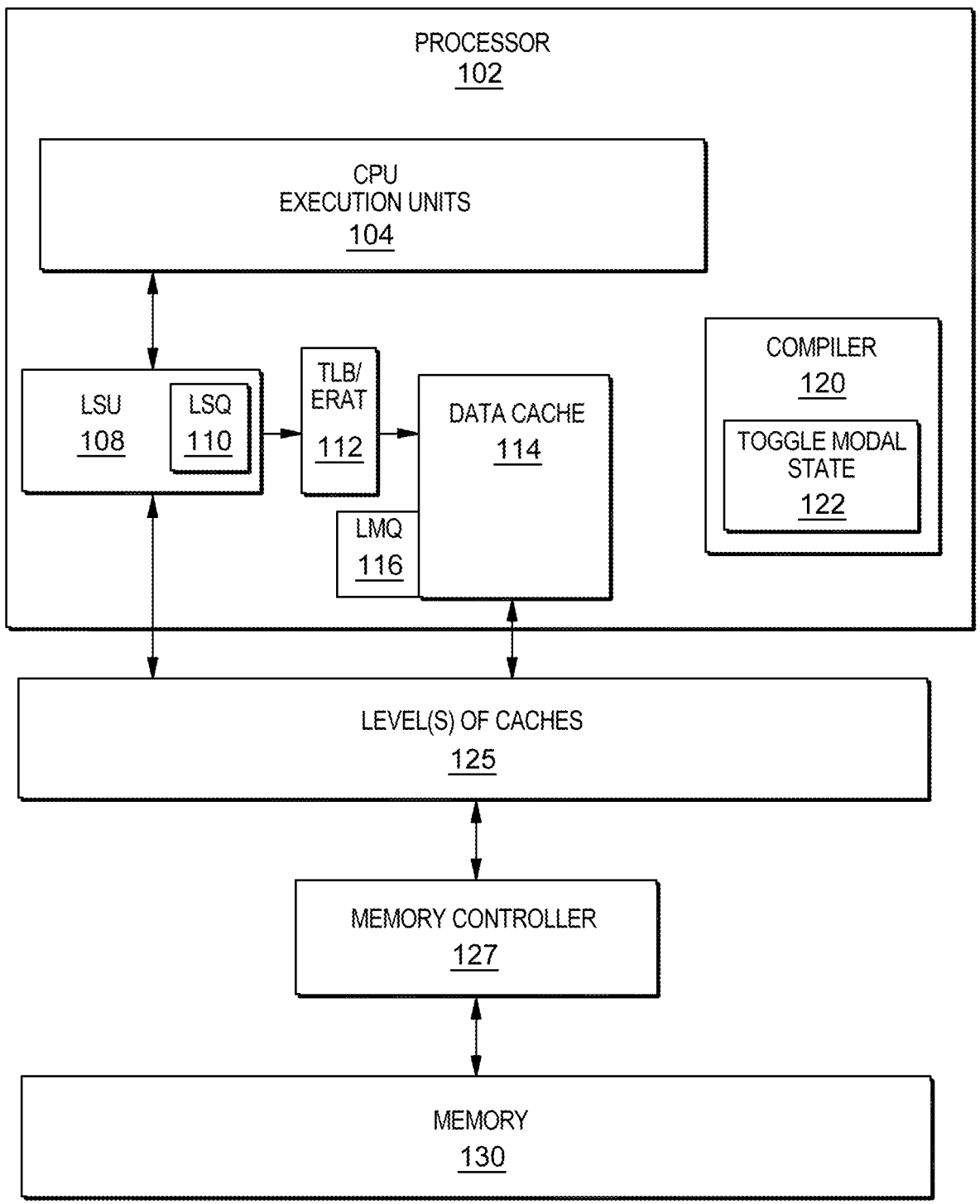
FIG. 1 depicts one example of a computing environment to incorporate and use one or more aspects of the present invention.

Referring to FIG. 1, in one example, a computing environment 100 includes at least one central processing unit (CPU) 102 (a.k.a., a processor) coupled to one or more levels of caches 125. Central processing unit 102 includes, for instance, one or more execution units 104 to request and consume data. Execution units 104 are coupled to a load/store unit (LSU) 108, which includes a load/store queue (LSQ) 110. Load/store unit 108 issues memory access operations (loads and stores) that retrieve prefetched data or cause the data to be fetched from the memory subsystem. LSU 108 may be coupled to a data cache 114 via, e.g., a translation mechanism 112, indicated as, e.g., a translation look-aside buffer (TLB) or an effective to real address translation table (ERAT).

Further CPU 102 may execute a compiler 120 to compile programs, and the compiler may use toggle modal state functionality 122, as described herein, to toggle the modal state of the processor.

CPU 102 is coupled to and communicates with a memory hierarchy that includes, for instance, data cache 114, which is a level one (L1) data cache; one or more other levels of caches 125, which may include a single level two (L2) cache or multiple other sequentially numbered levels, e.g., L3, L4; a memory 130; and an associated memory controller 127, which controls accesses to memory 130. L1 data cache 114 may serve as a prefetch buffer for data (and/or data streams) that are prefetched. L1 data cache 114 may have a corresponding load miss queue (LMQ) 116, which the cache utilizes to save information about ongoing prefetch requests.

In addition to the example memory hierarchy, computing environment 100 may also include additional storage devices that form a part of the memory hierarchy from the perspective of CPU 102. The storage devices may be one or more electronic storage media, such as a floppy disk, hard drive, CD-ROM, or DVD. CPU 102 communicates with each of the above devices within the memory hierarchy by various mechanisms, including via buses and/or direct channels, as examples.

Modern processors offer a program a chance to provide hints to the caching algorithms regarding the nature of the data being accessed, by providing transient or temporal access instructions. Using these instructions to access data indicates to the processor that the data being accessed will likely not be accessed in the near future, allowing the processor to decline storing the data in all or parts of the cache hierarchy, and thereby preserving some or all of the existing data that would otherwise be supplanted. These instructions, while useful, are tedious to use as they are often designed to access single data elements, providing a very fine grained ability to control what is accessed transiently. In many cases, it can be identified that the majority of a program's data accesses will be transient in nature, perhaps because it has entered an infrequent state of operation. Thus, in accordance with an aspect of the present invention, a coarser-grained mechanism is provided that identifies a plurality (e.g., many or all) data accesses of the program as transient for a selected period (e.g., a period of time or during a particular phase of the program's execution).

In one particular aspect, the capability includes providing instructions, in accordance with an aspect of the present invention, to toggle a modal state in the processor, in which execution of these instructions activates or deactivates a mode that indicates to the processor that data accesses (e.g., all or limited to one or more particular types) are transient.

As examples, the instructions are dedicated instructions to toggle a single transient state within the processor, or dedicated instructions to toggle multiple transient states within the processor, each state governing a different type of data access. Example types of data accesses may be, for instance, data loads performed by a general load instruction, data stores performed by a general store instruction, data loads and stores performed by a read-modify-write instruction, and instruction loads implicitly performed by the processor. Other examples also exist.

In another embodiment, the instructions are not dedicated instructions, but existing instructions that perform other actions that do not change the state of the program in any observable way. For example, an instruction that adds zero to a value has no effect on the program and is commonly referred to as a no-op. Such instructions are typically used to convey information to the processor without affecting the execution of the program. Using a no-op in this fashion has the benefit of not requiring the definition of a new instruction, which is useful if the number of instruction types that can be supported is limited, and also because a program using no-ops can run on a processor that does not recognize the additional information the no-op is intended to convey without any harm to the program.

Figure 2A:
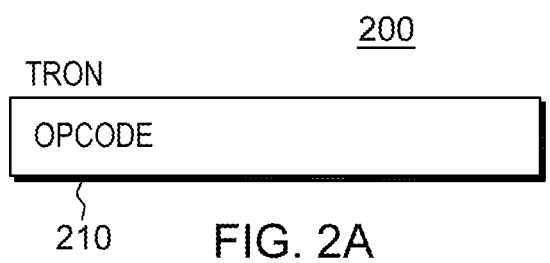
FIG. 2A depicts one example of an instruction to activate transient mode, in accordance with an aspect of the present invention.
Figure 2B:
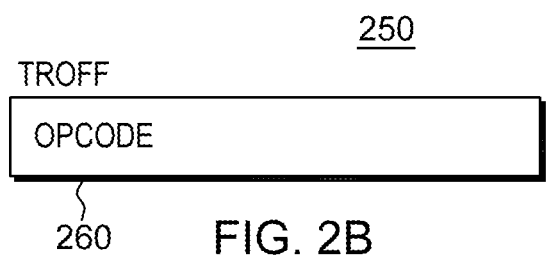
FIG. 2B depicts one example of an instruction to deactivate transient mode, in accordance with an aspect of the present invention.

In accordance with an aspect of the present invention, two general instructions are architecturally defined to toggle a modal transient data access state within the processor: TRON and TROFF. These instructions may be dedicated instructions, or pseudonyms for existing no-op instructions. Examples of these instructions are described with reference to FIGS. 2A-2B. FIG. 2A depicts one example of a TRON instruction 200 having an operation code (opcode) 210 that indicates activation of transient mode in the processor for memory accesses, or in the case of TRON being a pseudonym, may indicate another no-op operation but is understood as activating transient mode. Similarly, FIG. 2B depicts one example of a TROFF instruction 250 having an operation code (opcode) 260 that indicates deactivation of transient mode in the processor for memory accesses, or in the case of TROFF being a pseudonym, may indicate another no-op operation but is understood as deactivating transient mode. These instructions may be further subdivided or may include one or more operands, thereby allowing them to toggle one or more specific modal transient data access states should there be more than one state made available by the processor. For instance, an operand may specify a type of data access (referred to herein as Type X), including, for instance, data loads performed by a general load instruction, data stores performed by a general store instruction, data loads and stores performed by a read-modify-write instruction, or instruction loads implicitly performed by the processor. Many possibilities exist. An operand may specify more than one type or each operand may specify one type of data access. Other examples are also possible.

In a further example, one instruction is provided that is configured to activate and deactivate modal state based on an indicator included within or otherwise associated with the instruction. Other examples are possible.

Execution of the TRON instruction activates transient state for the program, which remains in effect until the TROFF instruction is executed. Any memory accesses or selected accesses if an access type is provided performed in between a TRON and TROFF are assumed to be transient in nature, thereby allowing the cache algorithm to decline storing the data in all or parts of the cache hierarchy, or allowing the cache algorithm to take some other optimal action based on the transient nature of the accessed data. The cache algorithm may also consider other parameters (either prior to, or after), in addition to the current transient state, when deciding how to treat the data being accessed.

In one embodiment, the TRON and TROFF instructions may be inserted by the author of the program because the author knows that the data accessed by the program at that time is rarely accessed, or that part of the program is rarely executed, or both. In another embodiment, the TRON and TROFF instructions may be inserted by an optimizing compiler or other software based on heuristics or measurement that has identified either the data accessed and/or instructions executed between the TRON and TROFF as being infrequently performed. The transient data access states may be implemented as an architectural state within the processor that is maintained across context switches or it may be implemented as a micro-architectural state that is lost if the processor is tasked with switching to and running another program by the operating system software.

Figure 3:
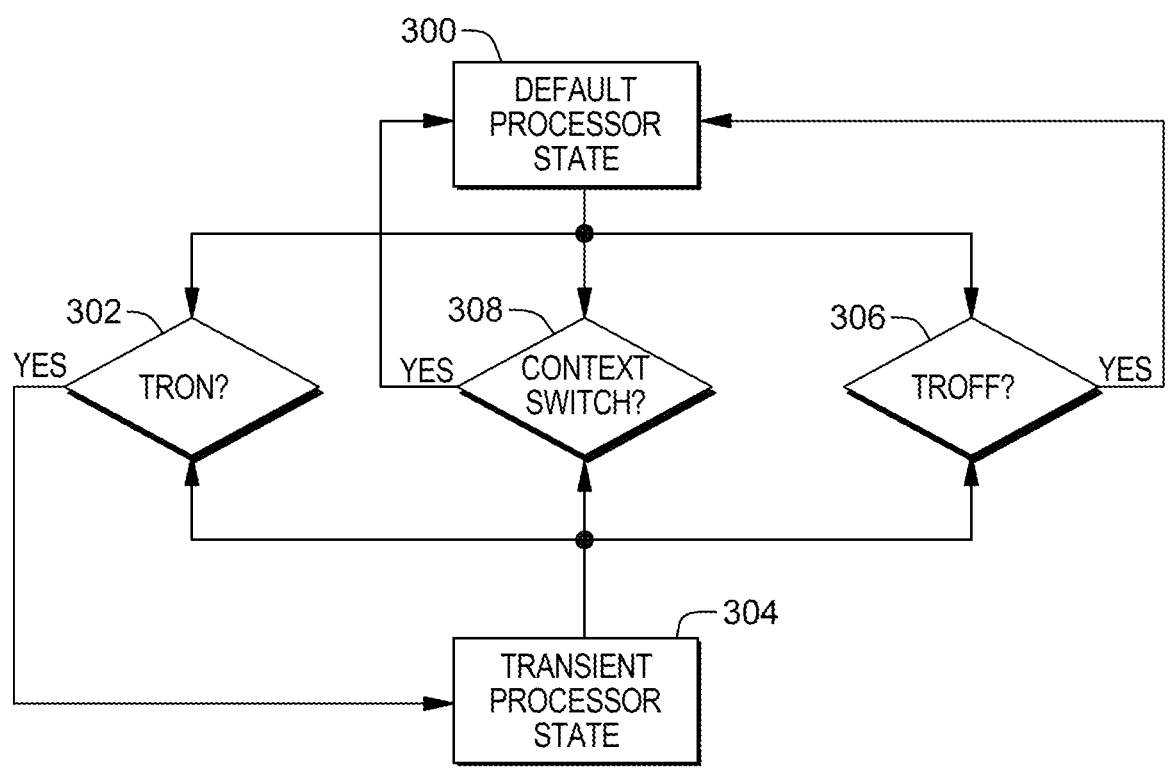
FIG. 3 depicts one example of a state transition diagram, in accordance with an aspect of the present invention.

One example of a state transition diagram showing the effect of execution TRON and TROFF (and a context switch, should the transient state be stored as a micro-architectural state, rather than an architectural state) has on the transient state of the processor is described with reference to FIG. 3. In one example, the processor is in a default processor state 300 and an inquiry is made as to whether TRON has been executed 302. If so, then the default state transitions to a transient state 304 and each memory access (or selected memory accesses if one or more access types are indicated) is treated as transient. While in the transient state, if TROFF is executed 306, then the processor transitions back to default state 300. Further, a context switch 308 may be performed that places the processor in the default state.

Figure 4:
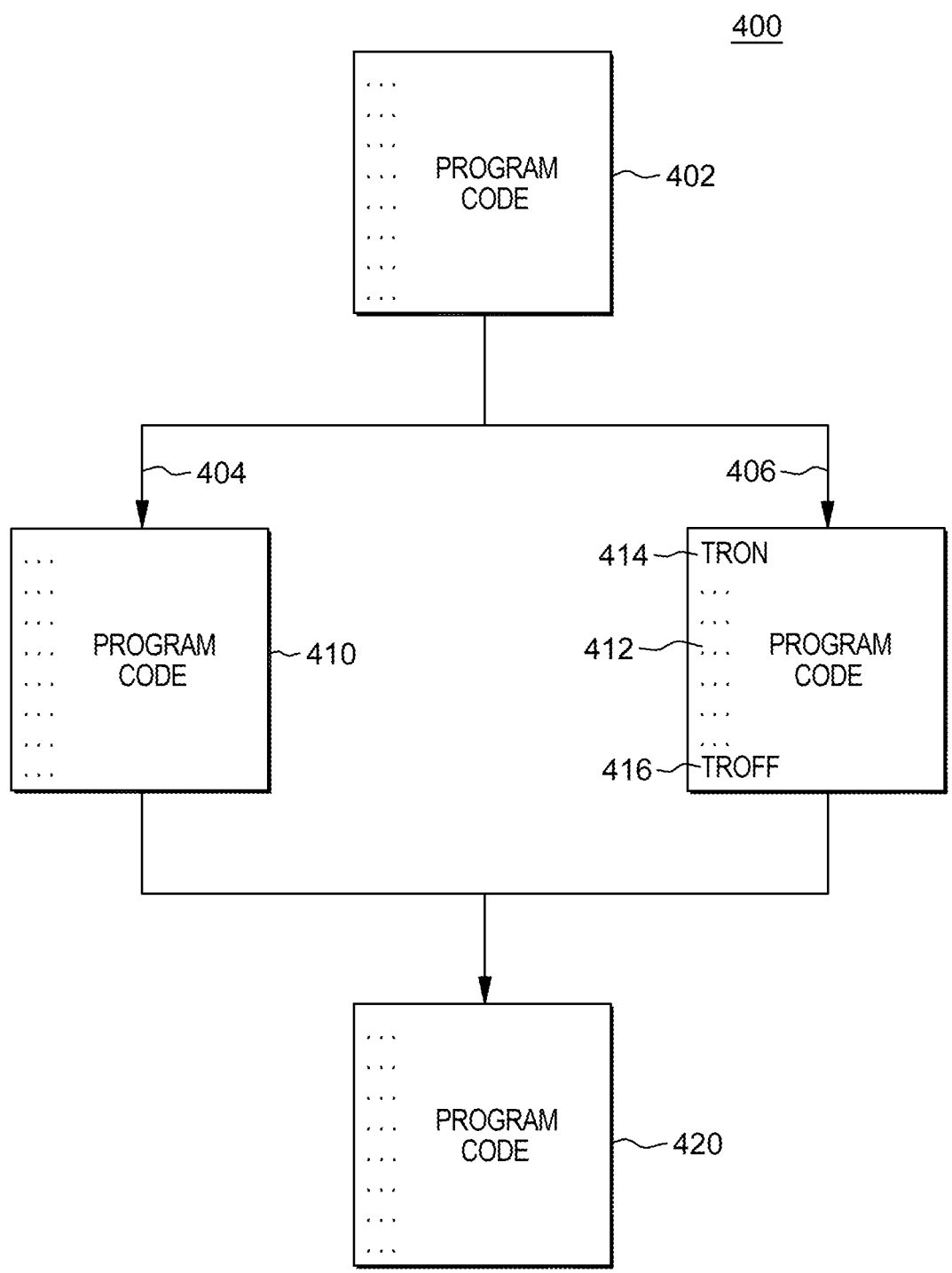
FIG. 4 depicts one example of a program including instructions to toggle modal transient state, in accordance with an aspect of the present invention.

An example of the inclusion of TRON/TROFF instructions in a program (also referred to herein as an application) is depicted in FIG. 4. As shown, a program 400 includes code 402, which may take two paths 404, 406, in which the first path 404 includes additional code 410 without TRON/TROFF instructions, and a second path 406 that includes additional code 412 with TRON/TROFF instructions. Thus, in the second path 406, TRON 414 is executed activating transient state in the processor for the program, which remains in place until TROFF 416 is executed. Each path then merges back into further code 420 of the program.

Figure 5:
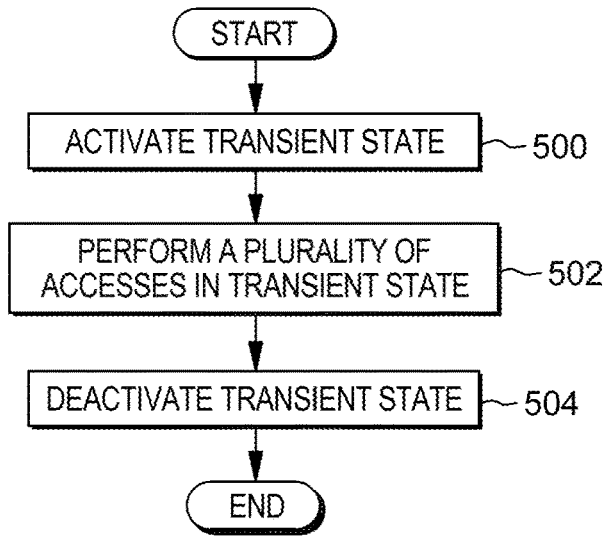
FIG. 5 depicts one embodiment of logic to use instructions to toggle modal transient state, in accordance with an aspect of the present invention.

Further details regarding the use of TRON/TROFF instructions are described with reference to FIG. 5. These instructions have been placed in the program code by a programmer or automatically by the compiler, as examples. The logic of FIG. 5 is performed by a processor. Initially, during program execution, the state of the processor for the particular program executing is toggled to activate transient state for memory accesses (either all memory accesses of the program or selected memory accesses based on provided data type(s)), STEP 500. In one example, the program executes TRON or another instruction to activate the transient state. Based on activating transient state, a plurality of memory accesses are performed while the processor is in transient state, STEP 502. These accesses are considered transient and are treated as transient, as defined by the architecture or configuration of the processor. For instance, transient data may be brought into the L1 cache, brought into the L2 cache and marked as least recently used, and not brought into the L3 cache. Other examples also exist.

The processor stays in transient mode for the program for a selected period, such as a certain amount of time or for a particular phase of program execution, and then it is deactivated, STEP 504. Deactivation is accomplished by executing TROFF or another instruction. Based on deactivation, non-transient memory accesses are performed. These accesses are defined architecturally or by configuration, and may include, e.g., bringing the data into the L1-L3 caches. Other examples also exist.

Figure 6:
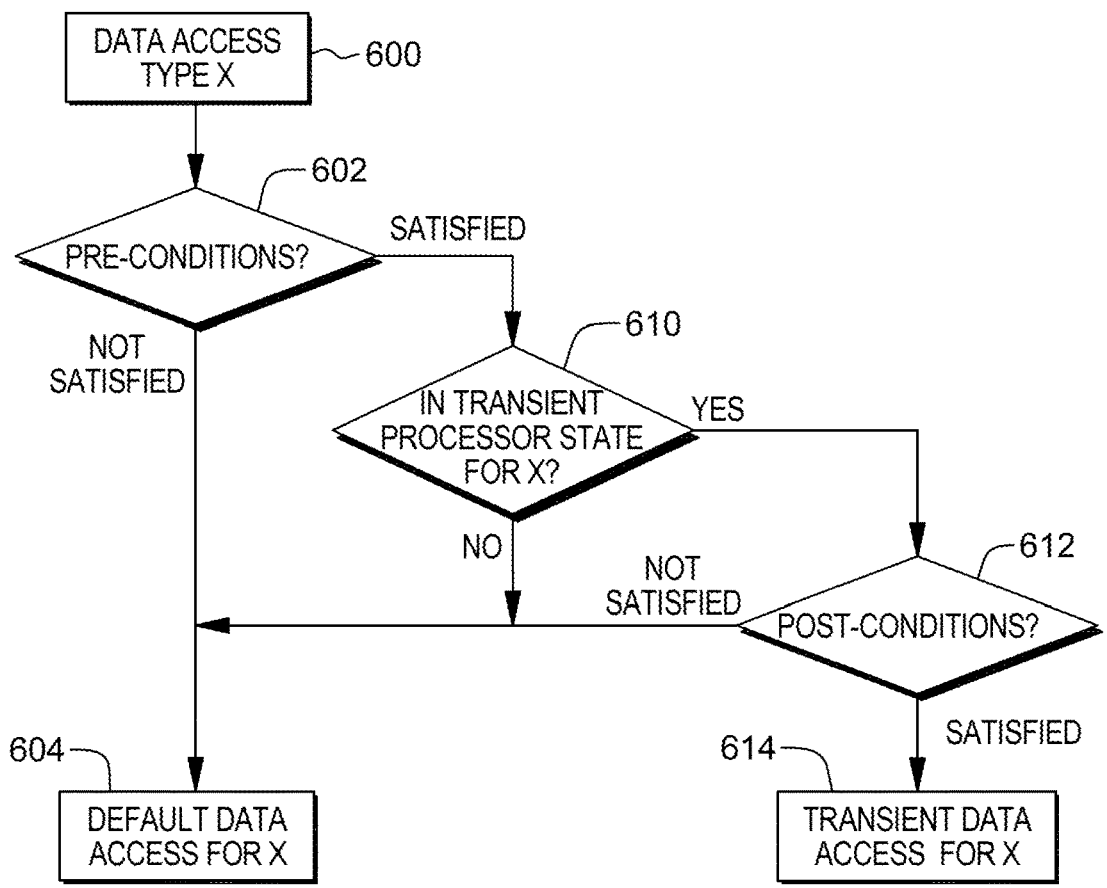
FIG. 6 depicts one example of logic to process a data access, in accordance with an aspect of the present invention.

Additional details regarding performing a memory access are described with reference to FIG. 6. This logic is performed by a processor. Initially, a data access of a particular type, Type X (e.g., data loads performed by a general load instruction, data stores performed by a general store instruction, data loads and stores performed by a read-modify-write instruction, and/or instruction loads implicitly performed by the processor, as examples) is received, STEP 600. A determination is made as to whether there are any pre-conditions that are to be satisfied for the access, INQUIRY 602. These pre-conditions may include loading particular registers, forming addresses, etc. If there are pre-conditions that have not been satisfied, then a default data access is provided consistent with Type X, STEP 604. For instance, the data may be brought into the L1, L2 and L3 data caches. Other default accesses are possible.

Returning to INQUIRY 602, if the pre-conditions, if any, are satisfied or there are no pre-conditions, then a determination is made as to whether the processor is in a transient state for memory accesses of Type X, INQUIRY 610. As examples, the processor may be in transient state for all data accesses or for specific data accesses. If specific data accesses are specified (e.g., by one or more operands of TRON), then a check is made as to whether the processor is in transient state for that data access type (e.g., Type X). If the processor is not in a transient state for Type X accesses, then a default data access is performed, STEP 604. However, if the processor is in the transient state for Type X accesses (i.e., for all data accesses or specifically for data accesses of Type X), then processing proceeds to a check as to whether there are any post-conditions to be satisfied, INQUIRY 612. Post-conditions may include a filter of selected instructions or other conditions the program wishes to check. If post-conditions have not been satisfied, then a default access is performed, STEP 604. Otherwise, if there are no post-conditions or any post-conditions have been satisfied, then a transient data access is performed for X, STEP 614. As described above, the transient access is treated as transient, as defined by the architecture or configuration of the processor. For instance, transient data may be brought into the L1 cache, brought into the L2 cache and marked as least recently used, and not brought into the L3 cache. Further or alternatively, the data may be marked as transient; and/or it will not replace other data that should not be replaced, etc. Other examples also exist.

Figure 7A:
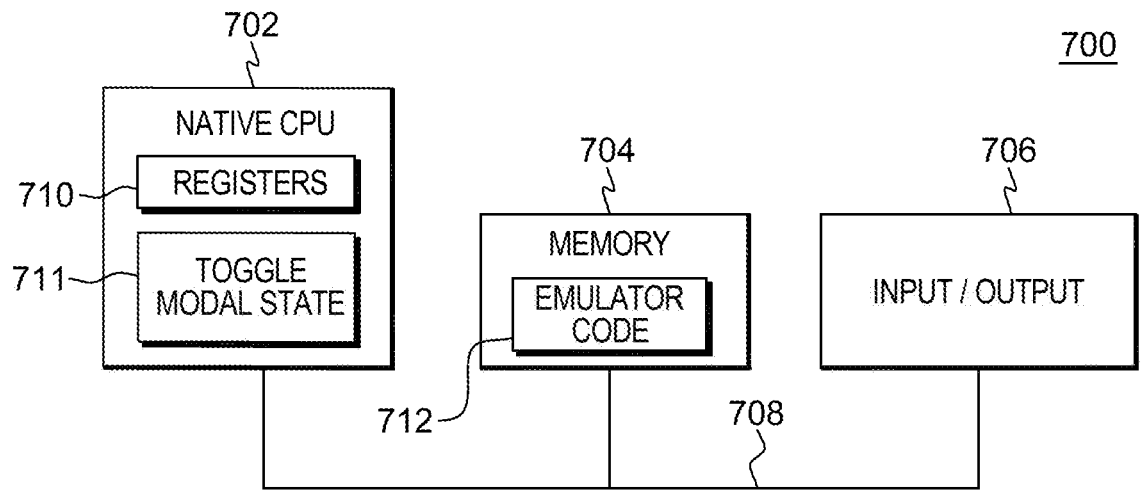
FIG. 7A depicts another example of a computing environment to incorporate and use one or more aspects of the present invention.

Described in detail herein is a technique for toggling modal transient state for a processor. One or more aspects of the present invention may be included and used in many types of computing environments. For instance, another example of a computing environment to incorporate and use one or more aspects of the present invention is described with reference to FIG. 7A. In this example, a computing environment 700 includes, for instance, a native central processing unit (CPU) 702, a memory 704, and one or more input/output devices and/or interfaces 706 coupled to one another via, for example, one or more buses 708 and/or other connections. As examples, computing environment 700 may include a z Systems server, a PowerPC processor or a Power Systems server offered by International Business Machines Corporation, Armonk, N.Y.; an HP Superdome with Intel Itanium II processors offered by Hewlett Packard Co., Palo Alto, Calif.; and/or other machines based on architectures offered by International Business Machines Corporation, Hewlett Packard, Intel, Oracle, or others.

Native central processing unit 702 includes one or more native registers 710, such as one or more general purpose registers and/or one or more special purpose registers used during processing within the environment, as well as a toggle modal state facility 711, used in accordance with an aspect of the present invention. These registers include information that represents the state of the environment at any particular point in time.

Moreover, native central processing unit 702 executes instructions and code that are stored in memory 704. In one particular example, the central processing unit executes emulator code 712 stored in memory 704. This code enables the computing environment configured in one architecture to emulate one or more other architectures. For instance, emulator code 712 allows machines based on architectures other than the z/Architecture, such as PowerPC processors, Power Systems servers, HP Superdome servers or others, to emulate the z/Architecture and to execute software and instructions developed based on the z/Architecture.

Figure 7B:
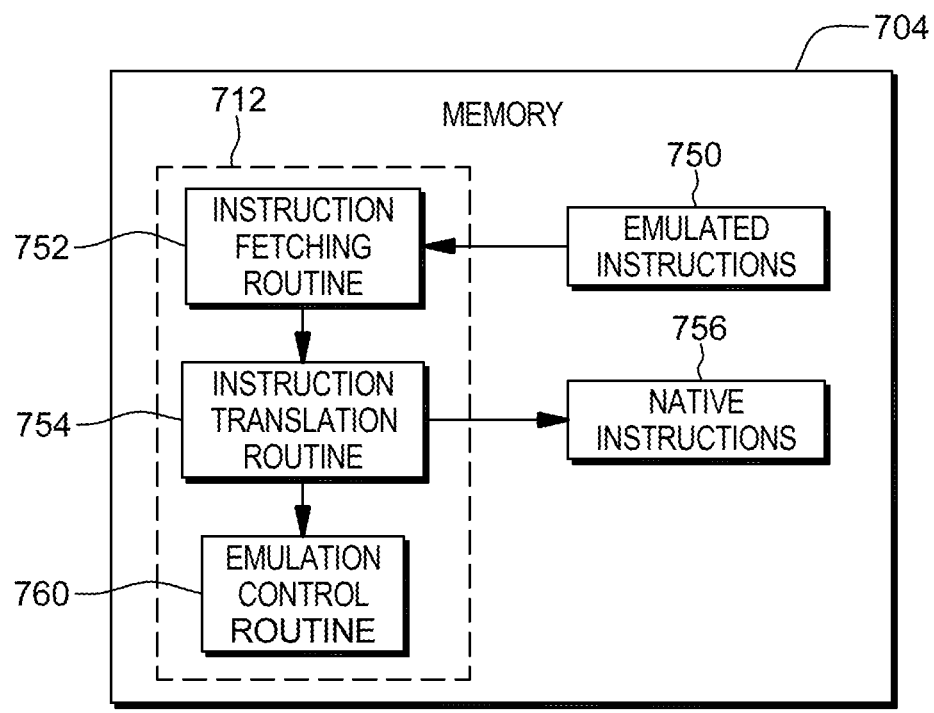
FIG. 7B depicts further details of the memory of FIG. 7A, in accordance with an aspect of the present invention.

Further details relating to emulator code 712 are described with reference to FIG. 7B. Emulated instructions 750 stored in memory 704 comprise software instructions (e.g., correlating to machine instructions) that were developed to be executed in an architecture other than that of native CPU 702. For example, emulated instructions 750 may have been designed to execute on a z/Architecture processor, but instead, are being emulated on native CPU 702, which may be, for example, an Intel Itanium II processor. In one example, emulator code 712 includes an instruction fetching routine 752 to obtain one or more emulated instructions 750 from memory 704, and to optionally provide local buffering for the instructions obtained. It also includes an instruction translation routine 754 to determine the type of emulated instruction that has been obtained and to translate the emulated instruction into one or more corresponding native instructions 756. This translation includes, for instance, identifying the function to be performed by the emulated instruction and choosing the native instruction(s) to perform that function.

Further, emulator code 712 includes an emulation control routine 760 to cause the native instructions to be executed. Emulation control routine 760 may cause native CPU 702 to execute a routine of native instructions that emulate one or more previously obtained emulated instructions and, at the conclusion of such execution, return control to the instruction fetch routine to emulate the obtaining of the next emulated instruction or a group of emulated instructions. Execution of the native instructions 756 may include loading data into a register from memory 704; storing data back to memory from a register; or performing some type of arithmetic or logic operation, as determined by the translation routine.

Each routine is, for instance, implemented in software, which is stored in memory and executed by native central processing unit 702. In other examples, one or more of the routines or operations are implemented in firmware, hardware, software or some combination thereof. The registers of the emulated processor may be emulated using registers 710 of the native CPU or by using locations in memory 704. In embodiments, emulated instructions 750, native instructions 756 and emulator code 712 may reside in the same memory or may be disbursed among different memory devices.

As used herein, firmware includes, e.g., the microcode, millicode and/or macrocode of the processor. It includes, for instance, the hardware-level instructions and/or data structures used in implementation of higher level machine code. In one embodiment, it includes, for instance, proprietary code that is typically delivered as microcode that includes trusted software or microcode specific to the underlying hardware and controls operating system access to the system hardware.

Described in detail herein is a capability for toggling modal state in a processor. By allowing the modal state to be toggled, performance of the processor may be improved by improving caching within the processor. Aspects of the invention are inextricably tied to computer technology.

Moreover, one or more aspects may relate to cloud computing.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as Follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as Follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as Follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for loadbalancing between clouds).

A cloud computing environment is service oriented with a focus on statelessness, low coupling, modularity, and semantic interoperability. At the heart of cloud computing is an infrastructure comprising a network of interconnected nodes.

Figure 8:
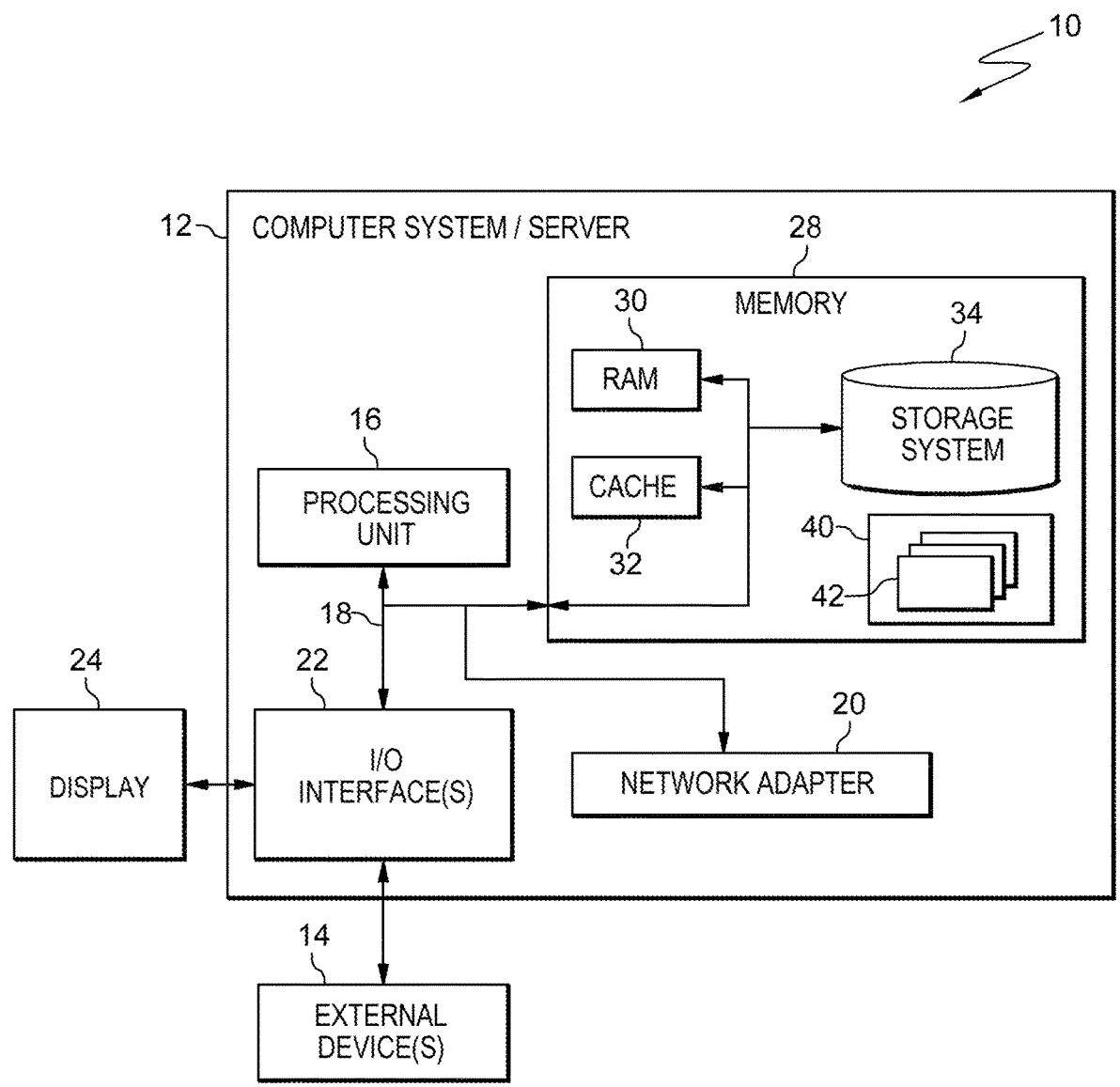
FIG. 8 depicts one embodiment of a cloud computing node.

Referring now to FIG. 8, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 8, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 9:
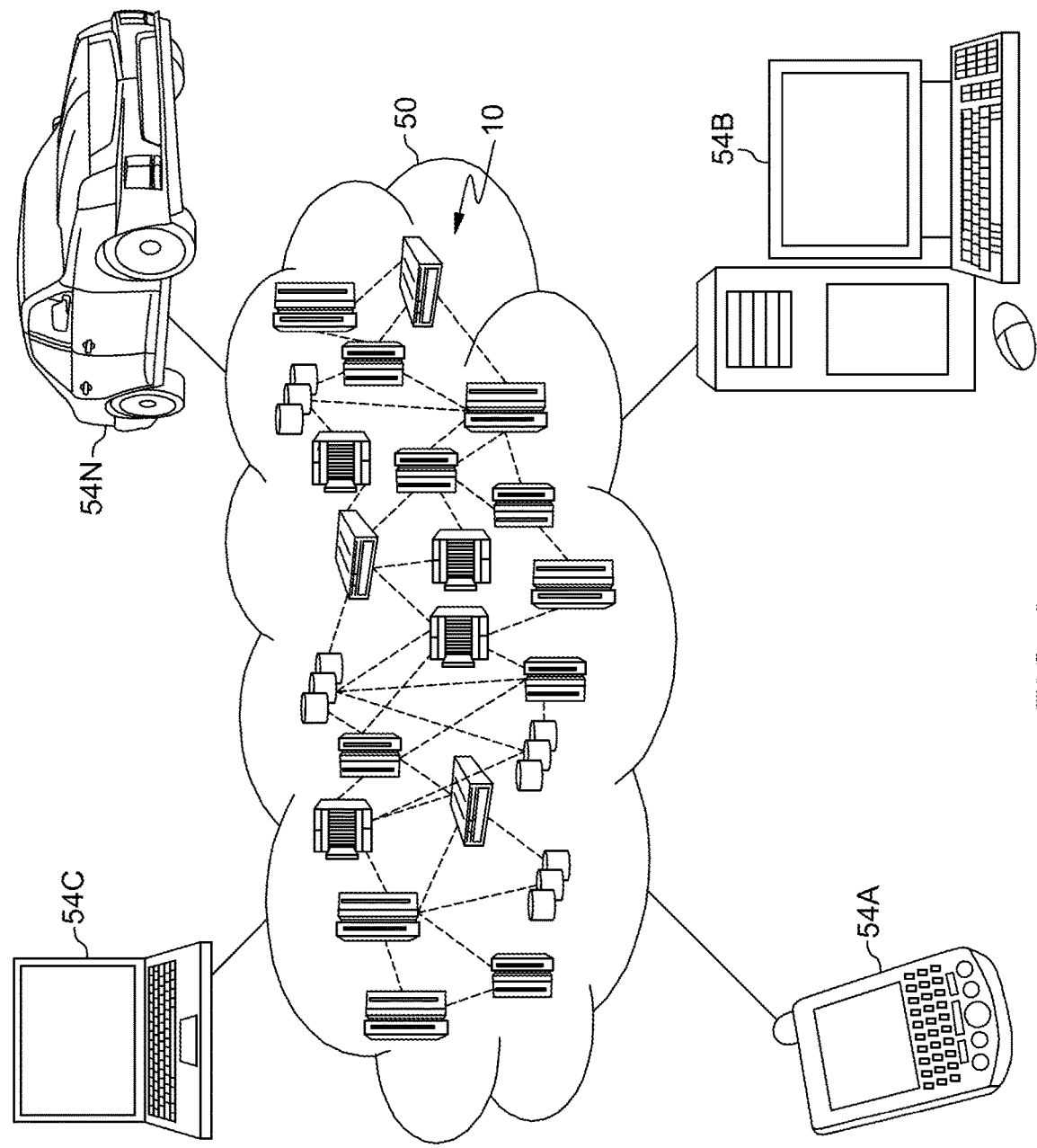
FIG. 9 depicts one embodiment of a cloud computing environment.

Referring now to FIG. 9, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 9 are intended to be illustrative only and that computing nodes 10 and cloud computing environment 50 can communicate with any type of computerized device over any type of network and/or network addressable connection (e.g., using a web browser).

Figure 10:
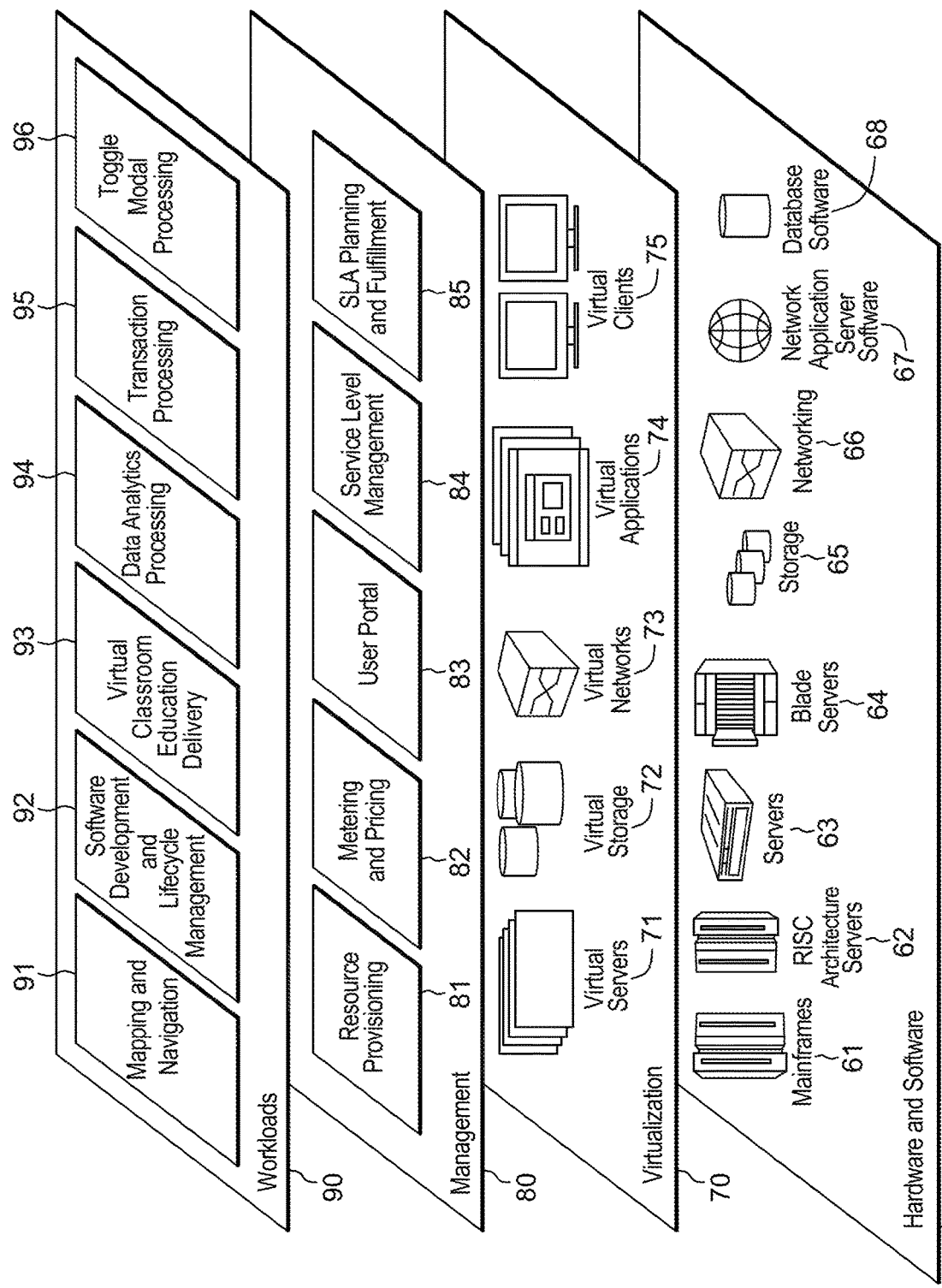
FIG. 10 depicts one example of abstraction model layers.

Referring now to FIG. 10, a set of functional abstraction layers provided by cloud computing environment 50 (FIG. 9) is shown. It should be understood in advance that the components, layers, and functions shown in FIG. 10 are intended to be illustrative only and embodiments of the invention are not limited thereto. As depicted, the following layers and corresponding functions are provided:

Hardware and software layer 60 includes hardware and software components. Examples of hardware components include mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and toggle modal processing 96.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD- ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

In addition to the above, one or more aspects may be provided, offered, deployed, managed, serviced, etc. by a service provider who offers management of customer environments. For instance, the service provider can create, maintain, support, etc. computer code and/or a computer infrastructure that performs one or more aspects for one or more customers. In return, the service provider may receive payment from the customer under a subscription and/or fee agreement, as examples. Additionally or alternatively, the service provider may receive payment from the sale of advertising content to one or more third parties.

In one aspect, an application may be deployed for performing one or more embodiments. As one example, the deploying of an application comprises providing computer infrastructure operable to perform one or more embodiments.

As a further aspect, a computing infrastructure may be deployed comprising integrating computer readable code into a computing system, in which the code in combination with the computing system is capable of performing one or more embodiments.

As yet a further aspect, a process for integrating computing infrastructure comprising integrating computer readable code into a computer system may be provided. The computer system comprises a computer readable medium, in which the computer medium comprises one or more embodiments. The code in combination with the computer system is capable of performing one or more embodiments.

Although various embodiments are described above, these are only examples. For example, computing environments of other architectures can be used to incorporate and use one or more embodiments. Further, different instructions, instruction formats, instruction fields and/or instruction values may be used. Many variations are possible.

Further, other types of computing environments can benefit and be used. As an example, a data processing system suitable for storing and/or executing program code is usable that includes at least two processors coupled directly or indirectly to memory elements through a system bus. The memory elements include, for instance, local memory employed during actual execution of the program code, bulk storage, and cache memory which provide temporary storage of at least some program code in order to reduce the number of times code must be retrieved from bulk storage during execution.

Input/Output or I/O devices (including, but not limited to, keyboards, displays, pointing devices, DASD, tape, CDs, DVDs, thumb drives and other memory media, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the available types of network adapters.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of one or more embodiments has been presented for purposes of illustration and description, but is not intended to be exhaustive or limited to in the form disclosed. Many modifications and variations will be apparent to those of ordinary skill in the art. The embodiment was chosen and described in order to best explain various aspects and the practical application, and to enable others of ordinary skill in the art to understand various embodiments with various modifications as are suited to the particular use contemplated.

What is claimed is:

1. A computer program product for facilitating processing in a computing environment, said computer program product comprising:
   a computer readable storage medium readable by a processing circuit and storing instructions for execution by the processing circuit for performing a method comprising:
      determining that an application will enter an infrequent state of operation, the infrequent state of operation including a plurality of memory accesses that are to be infrequently processed;
      based on the determining, providing one or more instructions architecturally defined to toggle a transient mode state in the processing circuit for a selected period within which the plurality of memory accesses are to be processed, the toggling allowing the processing circuit to decline storing data to be accessed, via the plurality of memory accesses, in at least a portion of a cache hierarchy for the selected period, the toggling facilitating preserving at least a portion of data stored in the cache hierarchy that would otherwise be supplanted by the data to be accessed via the plurality of memory accesses, wherein the cache hierarchy includes a plurality of levels of cache and is separate from a main memory, and wherein execution of the one or more instructions comprises:
         activating a transient mode for the application executing in the computing environment for the selected period;
         processing, based on activating the transient mode for the application, the plurality of memory accesses, wherein the plurality of memory accesses are processed as transient accesses, and wherein at least one memory access of the plurality of memory accesses being processed as a transient access has storing of data in one or more levels of the cache hierarchy declined based on the activating of the transient mode; and
         deactivating, based on reaching the selected period, the transient mode for the application.

2. The computer program product of claim 1, wherein the one or more instructions include two separately defined instructions, the two separately defined instructions comprising one instruction architecturally defined to activate the transient mode and an other instruction architecturally defined to deactivate the transient mode, and wherein the activating is performed by the one instruction architecturally defined to activate the transient mode, and the deactivating is performed by the other instruction architecturally defined to deactivate the transient mode.

3. The computer program product of claim 2, wherein the one instruction architecturally defined to activate the transient mode has associated therewith an operand to indicate a type of memory access of the plurality of memory accesses for which transient mode is to be activated, wherein transient mode is not to be activated for one or more other types of memory access of the plurality of memory accesses, the type of memory access being selected from a group of memory accesses consisting of: data loads performed by a general load instruction, data stores performed by a general store instruction, data loads and stores performed by a read-modify-write instruction, and instruction loads implicitly performed by a processor.

4. The computer program product of claim 2, wherein the method further comprises placing the one instruction architecturally defined to activate the transient mode and the other instruction architecturally defined to deactivate the transient mode in select locations of the application, the select locations being based on statistics identifying the plurality of memory accesses to be infrequent.

5. The computer program product of claim 4, wherein the placing is performed by a compiler executing in a processor of the computing environment.

6. The computer program product of claim 1, wherein the processing of the at least one memory access of the plurality of memory accesses as a transient access includes storing the data to be accessed via the plurality of memory accesses in one level of the cache hierarchy but not one or more other levels of the cache hierarchy.

7. The computer program product of claim 1, wherein the processing the plurality of memory accesses as transient accesses comprises:
   determining whether the plurality of memory accesses include a pre-specified type of memory access to be processed as a transient access; and
   processing the pre-specified type of memory access as a transient access, based on the determining indicating the plurality of memory accesses include the pre-specified type of memory access.

8. The computer program product of claim 7, wherein the determining whether the plurality of memory accesses include a pre-specified type of memory access comprises checking an indicator indicating one or more pre-specified types of access that are to be processed as a transient access.

9. The computer program product of claim 8, wherein the indicator is provided by an instruction used to activate the transient mode for the application.

10. The computer program product of claim 1, wherein the one or more instructions include a single architecturally defined instruction, the single architecturally defined instruction having an indicator used to activate or deactivate the transient mode.

11. A computer system for facilitating processing in a computing environment, said computer system comprising:
   a memory; and
   a processor in communication with the memory, wherein the computer system is configured to perform a method, said method comprising:
      determining that an application will enter an infrequent state of operation, the infrequent state of operation including a plurality of memory accesses that are to be infrequently processed;
      based on the determining, providing one or more instructions architecturally defined to toggle a transient mode state in the processor for a selected period within which the plurality of memory accesses are to be processed, the toggling allowing the processor to decline storing data to be accessed, via the plurality of memory accesses, in at least a portion of a cache hierarchy for the selected period, the toggling facilitating preserving at least a portion of data stored in the cache hierarchy that would otherwise be supplanted by the data to be accessed via the plurality of memory accesses, wherein the cache hierarchy includes a plurality of levels of cache and is separate from a main memory, and wherein execution of the one or more instructions comprises:
         activating a transient mode for the application executing in the computing environment for the selected period;
         processing, based on activating the transient mode for the application, the plurality of memory accesses, wherein the plurality of memory accesses are processed as transient accesses, and wherein at least one memory access of the plurality of memory accesses being processed as a transient access has storing of data in one or more levels of the cache hierarchy declined based on the activating of the transient mode; and
         deactivating, based on reaching the selected period, the transient mode for the application.

12. The computer system of claim 11, wherein the one or more instructions include two separately defined instructions, the two separately defined instructions comprising one instruction architecturally defined to activate the transient mode and an other instruction architecturally defined to deactivate the transient mode, and wherein the activating is performed by the one instruction architecturally defined to activate the transient mode, and the deactivating is performed by the other instruction architecturally defined to deactivate the transient mode.

13. The computer system of claim 12, wherein the one instruction architecturally defined to activate the transient mode has associated therewith an operand to indicate a type of memory access of the plurality of memory accesses for which transient mode is to be activated, wherein transient mode is not to be activated for one or more other types of memory access of the plurality of memory accesses, the type of memory access being selected from a group of memory accesses consisting of: data loads performed by a general load instruction, data stores performed by a general store instruction, data loads and stores performed by a read-modify-write instruction, and instruction loads implicitly performed by a processor.

14. The computer system of claim 12, wherein the method further comprises placing the one instruction architecturally defined to activate the transient mode and the other instruction architecturally defined to deactivate the transient mode in select locations of the application, the select locations being based on statistics identifying the plurality of memory accesses to be infrequent.

15. The computer system of claim 11, wherein the processing the plurality of memory accesses as transient accesses comprises:
   determining whether the plurality of memory accesses include a pre-specified type of memory access to be processed as a transient access; and
   processing the pre-specified type of memory access as a transient access, based on the determining indicating the plurality of memory accesses include the pre-specified type of memory access.

16. A computer-implemented method of facilitating processing in a computing environment, said computer-implemented method comprising:
   determining that an application will enter an infrequent state of operation, the infrequent state of operation including a plurality of memory accesses that are to be infrequently processed;
   based on the determining, providing one or more instructions architecturally defined to toggle a transient mode state in a processing circuit for a selected period within which the plurality of memory accesses are to be processed, the toggling allowing the processing circuit to decline storing data to be accessed, via the plurality of memory accesses, in at least a portion of a cache hierarchy for the selected period, the toggling facilitating preserving at least a portion of data stored in the cache hierarchy that would otherwise be supplanted by the data to be accessed via the plurality of memory accesses, wherein the cache hierarchy includes a plurality of levels of cache and is separate from a main memory, and wherein execution of the one or more instructions comprises:
      activating a transient mode for the application executing in the computing environment for the selected period;
      processing, based on activating the transient mode for the application, the plurality of memory accesses, wherein the plurality of memory accesses are processed as transient accesses, and wherein at least one memory access of the plurality of memory accesses being processed as a transient access has storing of data in one or more levels of the cache hierarchy declined based on the activating of the transient mode; and deactivating, based on reaching the selected period, the transient mode for the application.

17. The computer-implemented method of claim 16, wherein the one or more instructions include two separately defined instructions, the two separately defined instructions comprising one instruction architecturally defined to activate the transient mode and an other instruction architecturally defined to deactivate the transient mode, and wherein the activating is performed by the one instruction architecturally defined to activate the transient mode, and the deactivating is performed by the other instruction architecturally defined to deactivate the transient mode.

18. The computer-implemented method of claim 17, wherein the one instruction architecturally defined to activate the transient mode has associated therewith an operand to indicate a type of memory access of the plurality of memory accesses for which transient mode is to be activated, wherein transient mode is not to be activated for one or more other types of memory access of the plurality of memory accesses, the type of memory access being selected from a group of memory accesses consisting of: data loads performed by a general load instruction, data stores performed by a general store instruction, data loads and stores performed by a read-modify-write instruction, and instruction loads implicitly performed by a processor.

19. The computer-implemented method of claim 17, further comprising placing the one instruction architecturally defined to activate the transient mode and the other instruction architecturally defined to deactivate the transient mode in select locations of the application, the select locations being based on statistics identifying the plurality of memory accesses to be infrequent.

20. The computer-implemented method of claim 16, wherein the processing the plurality of memory accesses as transient accesses comprises:

determining whether the plurality of memory accesses include a pre-specified type of memory access to be processed as a transient access; and processing the pre-specified type of memory access as a transient access, based on the determining indicating the plurality of memory accesses include the pre-specified type of memory access.

* * * * *